United States Patent
Hamlyn

(10) Patent No.: US 12,179,441 B2
(45) Date of Patent: Dec. 31, 2024

(54) FIBER APPLICATION HEAD WITH ROLLER WITH RIGID RINGS

(71) Applicant: CORIOLIS GROUP, Queven (FR)

(72) Inventor: Alexander Hamlyn, Ploemeur (FR)

(73) Assignee: Coriolis Group, Queven (FR)

( * ) Notice: Subject to any disclaimer, the term of this patent is extended or adjusted under 35 U.S.C. 154(b) by 118 days.

(21) Appl. No.: 17/640,716

(22) PCT Filed: Aug. 31, 2020

(86) PCT No.: PCT/FR2020/000229
§ 371 (c)(1),
(2) Date: Mar. 4, 2022

(87) PCT Pub. No.: WO2021/044083
PCT Pub. Date: Mar. 11, 2021

(65) Prior Publication Data
US 2022/0324185 A1 Oct. 13, 2022

(30) Foreign Application Priority Data
Sep. 4, 2019 (FR) .................................. 1909655

(51) Int. Cl.
*B29C 70/38* (2006.01)
(52) U.S. Cl.
CPC ................... *B29C 70/384* (2013.01)
(58) Field of Classification Search
CPC .............. B29C 70/384; B29C 70/388
See application file for complete search history.

(56) References Cited

U.S. PATENT DOCUMENTS

| 2,464,020 | A | | 3/1949 | Breth | |
|---|---|---|---|---|---|
| 5,454,897 | A | * | 10/1995 | Vaniglia | B29C 70/384 156/577 |
| 8,991,014 | B2 | * | 3/2015 | De Mattia | B29C 70/384 19/299 |
| 2007/0044922 | A1 | * | 3/2007 | Mischler | B29C 70/382 156/577 |
| 2012/0037292 | A1 | * | 2/2012 | Williams, II | B44C 1/105 156/367 |
| 2020/0282667 | A1 | * | 9/2020 | Caffiau | B32B 7/00 |

FOREIGN PATENT DOCUMENTS

FR 3044255 A1 6/2017

OTHER PUBLICATIONS

PCT International Search Report and Written Opinion corresponding to PCT/FR2020/000229, dated Dec. 15, 2020.

* cited by examiner

*Primary Examiner* — George R Koch
*Assistant Examiner* — Christopher C Caillouet
(74) *Attorney, Agent, or Firm* — Husch Blackwell LLP

(57) ABSTRACT

A fiber application head for the production of composite material parts, including a compacting roller having a rigid central tube, at least one cylindrical piece made of an elastically deformable flexible material, assembled on the central tube and a plurality of independent rigid rings stacked side by side on the cylindrical piece. Each cylindrical piece includes a cylindrical outer surface by which each ring is intended to come to bear against the lay-up surface, and two collars mounted on the central tube, on either side of the cylindrical piece, being able to block in translation the stack of rings on the cylindrical piece.

10 Claims, 2 Drawing Sheets

FIBER APPLICATION HEAD WITH ROLLER WITH RIGID RINGS

RELATED CASES

The present application is a National Phase entry of PCT Application No. PCT/FR2020/000229, filed Aug. 31, 2020, which claims priority from FR Patent Application No. 1909655, filed Sep. 4, 2019, which applications are hereby incorporated by reference in their entireties.

TECHNICAL FIELD

The present invention relates to a fiber application head for a fiber application machine for the production of composite material parts, and more particularly to a so-called fiber placement head equipped with a particular application roller. The present invention also relates to a method for manufacturing composite material parts by means of a corresponding application head.

SUMMARY

Fiber application machines, commonly referred to as fiber placement machines, are known for the application by contact on a lay-up tool, such as a male or female mold, of a wide band formed of several continuous flat fibers, of ribbon type, dry or impregnated with thermoset or thermoplastic resin, in particular carbon fibers constituted by a multitude of carbon threads or filaments.

These machines are used to produce preforms formed by several superimposed plies, each ply being formed by laying up one or more bands side by side on the mold. In the case of a lay-up of fibers pre-impregnated with thermoplastic or thermoset resin, typically in a quantity of at least 40% by weight, the pre-impregnated preform obtained after lay-up is cured or polymerized by passing it through an oven to obtain a composite material part. In the case of so-called dry fibers, not pre-impregnated with resins, the fibers comprise a reduced amount of so-called binding resin, also called binder, generally a thermoplastic resin, in an amount less than or equal to 5% by weight, to give a sticky feature to the fibers during lay-up. After lay-up, the so-called dry preform is subjected to a resin injection or infusion operation before the curing step.

These machines, as described in patent document WO2006/092514, incorporated herein by reference, typically comprise a fiber application head, a system for displacing the head, fiber storage means, and fiber conveying means for conveying the fibers from the storage means to the head. The head typically comprises an application roller, also called a compacting roller, intended to come into contact against the mold to apply the band, and means for guiding the fibers onto the application roller.

The head also typically includes a heating system for heating the fibers. The compacting roller presses the band of fibers against the application surface of the mold, or against the previously applied band(s) of fibers, in order to facilitate the adhesion of the applied bands to each other, as well as to progressively evacuate the air trapped between the applied bands. The heating system ensures a heating of the band of fibers to be applied, and/or of the mold or of the bands already applied upstream of the compacting roller, just before the compaction of the band, in order to at least soften the pre-impregnation resin or the bonding resin, and thus to promote the adhesion of the bands between them.

In the case of thermoset resins, the pre-impregnated fibers are simply heated to soften them, typically to temperatures of about 40° C. The heating system typically comprises an infrared heating system comprising one or more infrared lamps.

In the case of thermoplastic resins, the fibers pre-impregnated or provided with a binder must be heated to higher temperatures, at least up to the melting temperature of the resin, i.e. about 200° C. for nylon type resins, and up to about 400° C. for PEEK type resins.

To reach these higher temperatures, hot air torch systems have been proposed, and more recently laser type heating systems have been proposed to achieve precise and concentrated heating. Due to the high heating temperatures, the fiber placement heads are typically equipped with heat resistant metal compacting rollers, which can also be cooled from the inside via a water circuit. In order to be able to conform to the profile of the application surface, segmented metal compacting rollers have been proposed, comprising several independent roller segments mounted side by side on a single axle, each segment being radially and independently movable and being elastically biased against the application surface by elastic means. Each segment typically comprises a ring rotatably mounted on a support via ball bearing systems, the support being mounted on a common axle for translational movement. Elastic means, such as individual springs or a bladder, embedded in the roller or acting on the rings at the opposite side of the application surface, urge the supports downwards. However, these segmented metal rollers are complex in structure and implementation.

Flexible rollers formed from a so-called high-temperature elastomer, including a thermal stabilizer, are also used. These rollers generally comprise an outer layer formed from a non-stick sheath that is heat-shrunk and glued to a cylinder of elastomeric material, as described in the patent documents FR 2948058 and FR 3009512, incorporated herein by reference. To cool them, it has been proposed to provide the placement heads with a cooling system able to deliver a flow of air to cool the roller from the outside or from the inside, as described in patent FR 2948058. Despite these cooling systems, flexible rollers may tend to deteriorate when thermoplastic resins are used. Depending on the heating temperatures used, the non-stick sheath may tend to degrade rapidly. The laser heating may tend to deteriorate the adhesive used for gluing the sheath and lead to a disassembly of the sheath and the cylinder made of flexible material. In addition, the deteriorated adhesive layer absorbs the laser radiation and can rise to high temperatures that can deteriorate the sheath.

It has also been proposed in the patent FR 3 044 255, incorporated herein by reference a flexible metallic outer layer, of low thickness, formed of a strip whose holding is ensured by gluing. The said metal layer serves as a screen for the thermal radiation emitted by the heating system, and prevents the compacting roller from overheating. The metal layer is flexible, so that the roller can be deformed to conform to the lay-up surface and allow lay-up with a compaction force. After compaction, the flexible material cylinder returns to its original shape and stresses the metal layer to its cylindrical shape. As above, the gluing may tend to deteriorate, due to high temperatures and/or due to oxidation of the metal layer over time. Furthermore, the three-dimensional deformability of the metal strip does not allow the use of such a roller in the case of strong curvature variations of the application surface along the length of the roller.

SUMMARY OF THE INVENTION

The purpose of the present invention is to propose a solution intended to overcome at least one of the aforementioned disadvantages, which in particular allows the use of a wide variety of resins, both thermoset and thermoplastic, with substantially uniform compaction of the applied band, and which is simple in design and construction.

For this purpose, embodiments of the present invention proposes a fiber application head for the production of composite material parts, comprising
- a compacting system comprising a compacting roller, also called application roller, for the application of one or more fibers, in particular of a band formed by one or more flat fibers onto an application surface, the compacting roller comprising a rigid central tube by means of which the roller is rotatably mounted on a support structure of the head, and at least one cylindrical piece made of an elastically deformable, flexible material, coaxially assembled, directly or indirectly, on the central tube
- and preferably a heating system able to emit a thermal radiation towards the fiber(s), preferably just before application by the application roller,
characterized in that the compacting roller further comprises a plurality of independent, preferably identical, rigid rings stacked side by side, coaxially, on the cylindrical piece, each having an outer cylindrical surface by which each ring is intended to come to bear against the lay-up surface, two collars mounted on the central tube, on either side of the cylindrical piece, being able to block in translation the stack of rings on the cylindrical piece, and to hold the rings against each other by their lateral surfaces.

According to embodiments of the invention, independent rings are mounted on an elastically deformable cylindrical piece, so that the rings are able to move radially independently of each other. The collars are mounted fixed in translation on the central tube, and preferably mounted fixed in rotation on the central tube, and have an external diameter smaller than the external diameter of the rings. The use of a roller provided with such rings according to embodiments the invention make it possible to obtain a thermally stable compacting roller that can be used for the application of fibers at high temperatures, in particular above 400° C., in particular for the application of fibers impregnated with thermoplastic resins, on non-planar application surfaces. The compacting roller is simple in design and construction, with rings mounted directly on an elastically deformable cylindrical piece, without complex bearing systems or elastic systems. The head according to embodiments of the invention equipped with such a roller offers the possibility of using a large variety of thermoset or thermoplastic resins combined with a large variety of fibers, synthetic or natural, hybrid or not, in particular fibers commonly used in the field of composites, such as glass fibers, carbon fibers, quartz fibers and aramid fibers.

According to an embodiment, each collar has on its lateral face facing the cylindrical piece an annular peripheral rib by which the collar bears against the lateral surface of the outer ring of the stack of rings or each collar has an annular peripheral rim by which the collar bears against the lateral surface of the outer ring of the stack of rings, the rib or rim defining a recess on the lateral face of the collar into which the cylindrical piece is able to extend when the cylindrical piece collapses under the effect of the compaction force. According to an embodiment, the cylindrical piece has a length greater than the length of the stack of rings, the cylindrical piece thus extending into the recesses of the collars, the cylindrical piece having an outer diameter which is smaller than the inner diameter of the annular peripheral ribs.

According to an embodiment, the compacting roller comprises metal rings, preferably made of steel, aluminum, brass, copper, or bronze. The metal rings may have, at least on their outer cylindrical surfaces, a non-stick and/or reflective treatment.

According to an embodiment, each ring is in the form of a washer, preferably flat, each ring has two opposite parallel flat lateral surfaces, with a width to thickness ratio greater than 1, preferably greater than 2, the width being defined as the difference between the outer diameter and the inner diameter of the ring, and the thickness being defined as the distance between the two opposite lateral surfaces.

According to an embodiment, each ring has sharp edges between its outer cylindrical surface and its lateral surfaces, in order to limit the marking of the deposited fibers, and/or each ring has chamfers or rounded edges connecting its inner cylindrical surface and its opposite lateral surfaces.

According to an embodiment, the compacting roller comprises a cylindrical piece made of an elastomeric material, preferably unexpanded, for example a silicone or a polyurethane, preferably having a hardness between 25 shore A and 90 shore A, preferably of at least 40 shore A. According to an embodiment, the cylindrical piece comprises recesses, for example longitudinal recesses opening on its lateral surfaces and/or cells, the recesses and/or cells allowing to increase the deformation capacity of the cylindrical piece.

According to another embodiment, the compacting roller comprises a cylindrical piece made of foam, for example an expanded elastomer such as polyurethane foam, preferably with a density between 200 $kg/m^3$ and 500 $kg/m^3$.

According to an embodiment, the cylindrical piece is obtained by molding onto the central tube. According to another embodiment, the cylindrical part is obtained separately, for example by molding in a separate mold, and is then assembled on the central tube by press-fitting on the central tube. In this last embodiment, the cylindrical part can be easily replaced in case of wear or deterioration, and/or when the user wishes to change the hardness of the cylindrical piece.

According to an embodiment, the head constitutes a fiber placement head comprising cutting means and rerouting means, and optionally fiber blocking means. According to an embodiment, the head is used to perform a filament winding type application.

According to an embodiment, the head comprises a laser-type heating system, in particular laser diodes, a YAG laser or a fiber laser, able to emit a laser beam towards the contact zone between the roller and a lay-up surface. Alternatively, the heating system may comprise one or more infrared lamps, or a flash lamp type heating system, as described in patent WO2014/029969 or WO2017/134453, incorporated herein by reference.

Embodiments of the present invention also relate to a method for manufacturing a composite material part comprising the application of continuous fibers onto an application surface, characterized in that the application of fibers is carried out by means of a fiber application head as previously described, by relative displacement of the application head with respect to the lay-up surface along lay-up paths, the fibers being compacted during their application by means of the application roller.

The fibers conventionally used are continuous flat fibers, also called tows, generally unidirectional, and comprising a multitude of filaments. The deposited fibers can be dry fibers or fibers pre-impregnated with thermoset or thermoplastic resin. The fibers typically have widths of ⅛, ¼ or ½ inches. As used herein, the term "fibers" also refers to fibers of greater width, greater than ½ inch, conventionally referred to as tape in placement technology.

The method according to embodiments of the invention is particularly advantageous in the case of the production of dry preforms made from dry fibers provided with a binder and/or thermoplastic preforms made from fibers pre-impregnated with thermoplastic resin, requiring high heating temperatures during lay-up in order to at least reach the melting point of the binder and/or the thermoplastic resins.

In the case of a dry preform, the method further comprises a step of impregnating resin into the dry preform, by adding one or more impregnating resins by infusion or injection to the dry preform, and a curing step to obtain a composite material part. In the case of a thermoplastic preform, the preform may optionally be subjected to an additional consolidation step to obtain a final composite material part. An in situ consolidation can also be achieved during the application of the fibers.

The application of fibers may be performed on the application surface of a tooling to make a preform, as described above, by fiber placement, tape placement, and/or winding. According to another embodiment, the application of fibers is performed directly on the application surface of a prefabricated part, to reinforce this part with reinforcements of unidirectional fibers, the prefabricated part being for example a part obtained by injection, molding or additive manufacturing, from one or more thermoplastic and/or thermoset resins.

The invention will be better understood, and other purposes, details, features and advantages will become clearer in the course of the following detailed explanatory description of a presently preferred particular embodiment of the invention, with reference to the attached schematic drawings.

DETAILED DESCRIPTION

Figure 1:
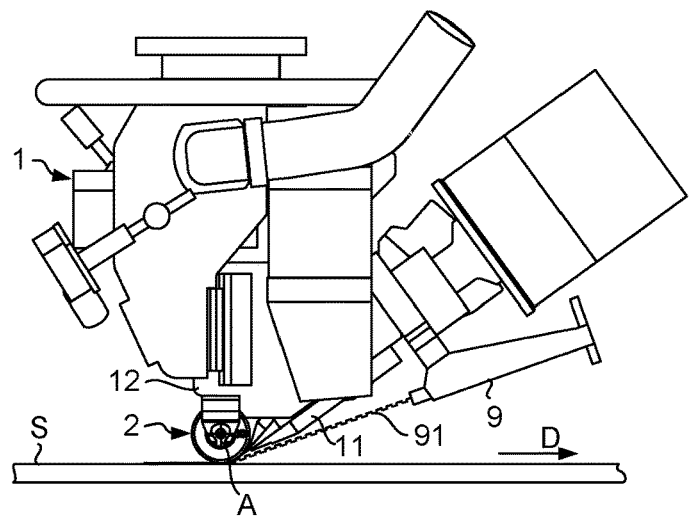
FIG. 1 is a schematic side view of a fiber application head according to an embodiment of the invention, illustrating the compacting roller and the heating system.
Figure 2:
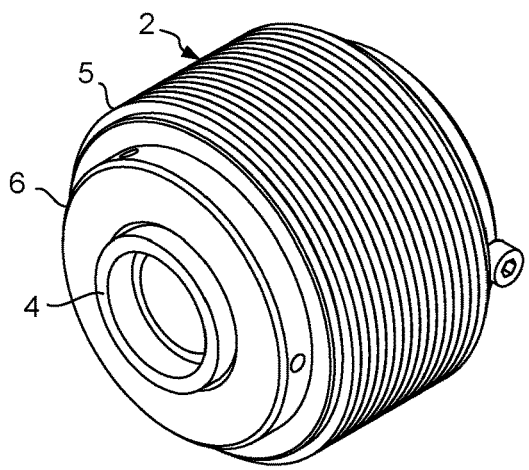
FIG. 2 is a schematic perspective view of the compacting roller of FIG. 1.
Figure 3:
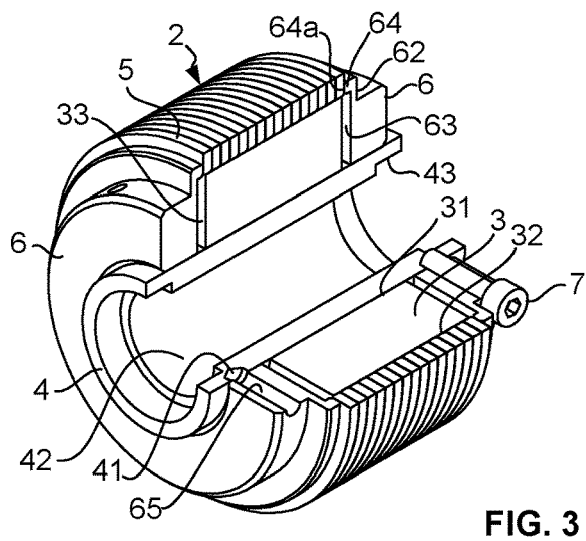
FIG. 3 is a view similar to FIG. 2, with a partial cutaway.
Figure 4:
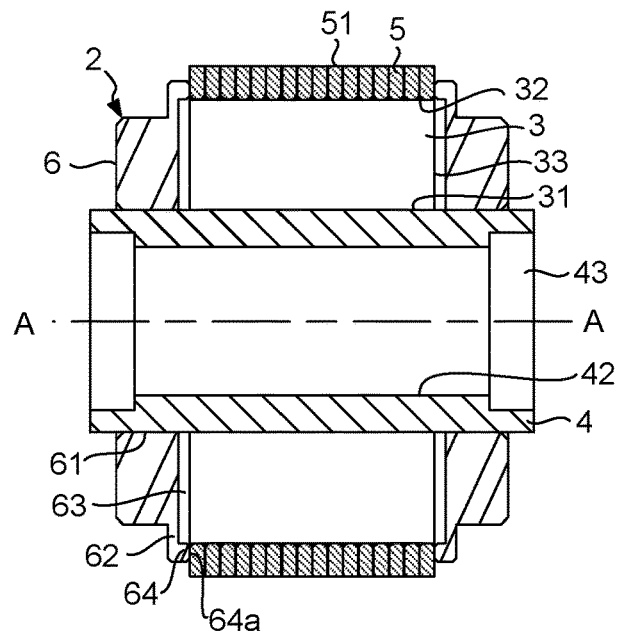
FIG. 4 is a longitudinal sectional view of the compacting roller of FIG. 2.

With reference to FIG. 1, the application head 1 comprises a compacting roller 2 which is rotatably mounted around an axis A on a support structure 12 of the head. The head is intended for applying a band formed by several fibers arranged side by side. The head is mounted by the support structure 12 at the end of a displacement system (not shown), for example a robot wrist. The head further comprises a heating system 9 also mounted on the support structure, upstream of the roller with respect to the advancement direction D of the application head during the application of the band of fibers on an application surface S. The heating system is, for example, a laser-type heating system, the radiation of which is directed towards the band, just before its compaction, as well as towards the already deposited band(s). As illustrated in FIG. 1, the radiation 91 is thus directed obliquely towards the nip or contact zone between the application roller and the application surface, in order to heat a portion of band arranged on the roller, before its compaction by the latter, as well as the application surface and/or one or several previously applied bands. In the case of a fiber placement machine, the head comprises guiding means 11 which guide the fibers entering the head towards the compacting roller 2 in the form of a band of fibers, the fibers of the band being arranged side by side in a substantially contiguous manner. By displacing the head by the robot, the compacting roller is brought into contact with the application surface of a mold S for applying the band. The fibers are preferably flat continuous fibers, such as tows, pre-impregnated with a thermoset resin or a thermoplastic resin, or dry fibers provided with a binder. The binder is in the form of powder and/or one or more veils, preferably of thermoplastic type.

With reference to FIGS. 2 to 6, the compacting roller 2 with axis A comprises a cylindrical piece or body 3 made of a flexible material, elastically deformable by compression. The cylindrical piece has a cylindrical central passage 31 for its assembly on a support core formed by a rigid cylindrical central tube 4, for example made of metal, such as aluminum. The cylindrical piece 3 and the central tube 4 are coaxial and are integral in rotation with each other. The cylindrical piece here comprises a single cylindrical portion with an outer cylindrical surface 32 and two parallel flat lateral surfaces 33.

According to embodiment of the invention, the cylindrical surface 32 of the cylindrical piece is covered with an outer layer formed by a plurality of identical rings 5, fitted onto the cylindrical piece and stacked against each other.

Each ring 5 has a cylindrical outer surface 51 defining the outer diameter of the ring, a cylindrical inner surface 52 defining the inner diameter of the ring, and two opposing flat lateral surfaces 53. The rings cover the entire cylindrical surface of the cylindrical piece, with the length of the stack corresponding substantially to the length of the cylindrical piece. The rings have an inner diameter corresponding substantially to the outer diameter of the cylindrical part. The rings are fitted onto the cylindrical part and stacked side by side, flat against each other, in contact by their flat lateral surfaces.

Each ring has a substantially parallelepipedal cross-section, and is in the form of a flat washer, with a thickness E corresponding to the distance between the two lateral surfaces 53, and a width L corresponding to the distance between the cylindrical outer surface 51 and the cylindrical inner surface 52, or to the difference between the inner diameter and the outer diameter of the ring, which are such that the ratio L/E is greater than 1, preferably greater than 2.

The roller is equipped with two collars 6, preferably metallic, mounted on the central tube on either side of the cylindrical piece to block the stack of rings on the cylindrical piece. Each collar has a central passage 61 for its mounting on the central tube, and comprises a base 62, of larger diameter by which the collar comes against the facing lateral surface of the last ring of the stack of rings, called the outer ring.

The base 62 has a peripheral annular rim or rib 64 on its outer surface defining a central cylindrical recess 63. The inner diameter of the peripheral annular rib is equal to or greater than the diameter of the cylindrical piece, the latter being substantially equal to the inner diameter of the rings. The outer diameter of the peripheral annular rib, which corresponds to the outer diameter of the base, is less than the outer diameter of the rings. The collar is thus in contact only with the lateral surface of the outer ring by the outer annular surface 64a of the peripheral annular rib. Alternatively, the rings are without a base and have a constant outer diameter.

Each collar 6 is attached to the central tube by means of screws 7, for example three screws, each of which is screwed into a radial threaded hole 65 in the collar, and the screw end of which fits into cavities 41 in the central tube. Alternatively, each collar can be screwed onto a threaded end of the central tube.

The cylindrical piece 3 made of a flexible material gives the compacting roller a crushing ability that allows the compacting roller to conform to variations in the curvature of the application surface and thus to apply a substantially uniform pressure to the entire deposited band. The rigid central tube allows the roller to be rotatably mounted on the support structure. The rings, by the cylindrical outer surfaces 51 of which the roller is in contact with the band, serve as a shield for the thermal radiation emitted by the heating system, and prevent the compacting roller from overheating.

As an example, the cylindrical piece is obtained by molding on the central tube, the assembly of the cylindrical piece on the central tube being obtained during the molding, with a possible appropriate surface treatment of the central tube. The assembly of the roller on the head can be carried out by means of an axial rod, mounted in the internal passage 42 of the central tube 4 by means of two ball bearings, and mounted fixed in rotation on the support structure 12 between two support members. The central tube advantageously has a first counterbore 43 at each end for mounting a bearing.

Figure 5:
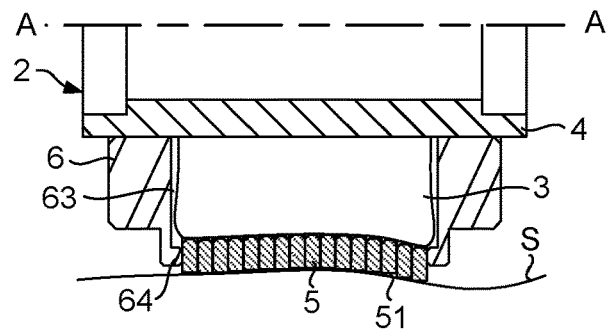
FIG. 5 is a view of the compacting roller similar to FIG. 4 when using the compacting roller on a complex lay-up surface; and, FIG. 6 is an enlarged partial view of FIG. 4 illustrating a section of a rigid ring of the compacting roller.
Figure 6:
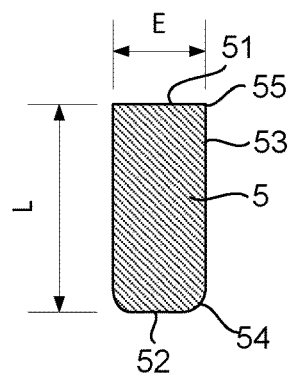

With reference to FIG. 5, during use, the rings 5 can move radially under the compaction force applied by the head, independently of each other, to conform to the lay-up surface. Under the effect of the compaction force, the cylindrical piece 3 can collapse and extend laterally, as shown in the figure. Recess 63 in the center of the collar base serves as a receptacle to receive the deformed cylindrical piece. These recesses prevent contact between the collars and the cylindrical piece and thus limit damage to the cylindrical piece. The distance between the outer diameter of the collars at their base and the outer diameter of the rings, as well as the hardness of the cylindrical piece define the maximum radial displacement of the rings, and will be chosen according to the desired compaction force and the complexity of the lay-up surface.

To limit a damage of the cylindrical surface 32 of the cylindrical piece, the junction between each lateral surface 53 and the cylindrical inner surface 52 of a ring is made by a rounded edge 54. On the outside, to limit marking of the laid-up preform, as well as fouling of the roller by impregnating resin contained in fibers and/or blocking of filaments constituting the fibers between two adjacent rings, the rings have sharp edges 55 between the cylindrical outer surface 51 and the two lateral surfaces 53, without any chamfer or rounded edge.

According to an embodiment, the length of the stack of rings is less than the length of the cylindrical piece, the cylindrical piece comprising end portions positioned in the recesses of the collars, the external diameter of the cylindrical piece being less than the internal diameter of the annular peripheral ribs so as to maintain a clearance between the ribs and the cylindrical piece.

The cylindrical piece is, for example, made of a non-expanded elastomer, such as a silicone or polysiloxane, or a polyurethane, preferably a silicone, for example a two-component silicone that can be polymerized at room temperature. The cylindrical piece has a hardness of 40, 50 or 60 shore A, which will be chosen according to the desired crushing rate of the roller for a given compaction effort, this crushing rate being defined in particular according to the complexity of the application surface.

The rings are made of metal, for example copper, and each ring has a substantially parallelepipedal cross-section, and is in the form of a flat washer, with for example a thickness E of about 2 mm, and a width L of about 4.5 mm.

The laser-type heating system may comprise laser diodes, arranged in one or more rows, emitting radiation of wavelength(s) between 880 to 1030 nm, for example, a fiber-optic laser or a YAG laser, emitting at a wavelength of about 1060 nm.

Although embodiments of the invention has been described in connection with a particular embodiment, it is quite clear that it is in no way limited thereto and that it includes all technical equivalents of the means described as well as combinations thereof if these fall within the scope of the invention.

The invention claimed is:

1. A fiber application head for producing composite material parts, comprising a compacting system comprising a compacting roller for applying one or more fibers onto an application surface, said compacting roller comprising a rigid central tube by means of which said roller is rotatably mounted on a support structure of the head, and at least one cylindrical piece made of an elastically deformable flexible material, coaxially assembled on said central tube, and wherein said compacting roller further comprises a plurality of independent rigid rings, stacked side by side, in contact by their lateral surfaces, coaxially on the cylindrical piece, each having an outer cylindrical surface by which each ring is intended to come to bear against the application surface, two collars mounted on the central tube, on either side of the cylindrical piece, being able to block in translation the stack of rings on the cylindrical piece, and to hold the rings against each other by their lateral surfaces, each collar having an annular peripheral rib by means of which the collar bears against the lateral surface of the outer ring of the stack of rings, said rib defining a recess into which the cylindrical piece is able to extend when said cylindrical piece collapses under the effect of the compacting force.

2. A fiber application head according to claim 1 wherein that the compacting roller comprises metal rings.

3. A fiber application head according to claim 1, wherein each ring has two opposite plane parallel lateral surfaces, with a width to thickness ratio (L/E) greater than 1.

4. A fiber application head according to claim 1 wherein each ring has sharp edges between its outer cylindrical surface and its lateral surfaces.

5. A fiber application head according to claim 1 wherein said compacting roller comprises a cylindrical piece made of an elastomeric material having a hardness of between 25 shore A and 90 shore A.

6. A fiber application head according to claim 1 wherein the compacting roller comprises a cylindrical piece made of foam with a density between 200 kg/m$^3$ and 500 kg/m$^3$.

7. A fiber application head according to claim 1, wherein each ring has two opposite plane parallel lateral surfaces, with a width to thickness ratio (L/E) greater than 2.

8. A fiber application head according to claim 1, wherein said compacting roller comprises a cylindrical piece made of an elastomeric material having a hardness of between 40 shore A and 90 shore A.

9. A fiber application head for producing composite material parts, comprising a compacting system comprising a compacting roller for applying one or more fibers onto an application surface, said compacting roller comprising a rigid central tube by means of which said roller is rotatably mounted on a support structure of the head, and at least one cylindrical piece made of an elastically deformable flexible material, coaxially assembled on said central tube, and wherein said compacting roller further comprises a plurality of independent rigid rings, stacked side by side, in contact by their lateral surfaces, coaxially on the cylindrical piece, each having an outer cylindrical surface by which each ring is intended to come to bear against the application surface, two collars mounted on the central tube, on either side of the cylindrical piece, being able to block in translation the stack of rings on the cylindrical piece, and to hold the rings against each other by their lateral surfaces, wherein each ring has chamfers or rounded edges connecting its inner cylindrical surface and its opposite lateral surfaces.

10. A method for manufacturing a composite material part comprising the application of continuous fibers onto an application surface, wherein the application of fibers is carried out by means of a fiber application head according to claim 1, by relative displacement of the application head with respect to the application surface according to application paths, the fibers being compacted during their application by means of said application roller.

* * * * *